(12) United States Patent
Fujimori (10) Patent No.: US 10,498,787 B2
(45) Date of Patent: Dec. 3, 2019

(54) COMMUNICATION APPARATUS, COMMUNICATION METHOD, AND PROGRAM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 14/933,560

(22) Filed: Nov. 5, 2015

(65) Prior Publication Data

US 2016/0134674 A1    May 12, 2016

(30) Foreign Application Priority Data

Nov. 8, 2014    (JP) ................. 2014-227616

(51) Int. Cl.
| | |
|---|---|
| H04L 29/06 | (2006.01) |
| H04L 29/08 | (2006.01) |
| H04N 21/472 | (2011.01) |
| H04N 21/845 | (2011.01) |

(52) U.S. Cl.
CPC .............. *H04L 65/60* (2013.01); *H04L 65/80* (2013.01); *H04L 67/02* (2013.01); *H04N 21/47202* (2013.01); *H04N 21/8456* (2013.01); *H04L 67/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0129371 | A1* | 9/2002 | Emura | G07F 17/0014 725/61 |
| 2011/0302319 | A1* | 12/2011 | Ha | H04N 21/23439 709/231 |
| 2013/0160063 | A1* | 6/2013 | Rashid | H04L 65/608 725/109 |
| 2014/0129669 | A1* | 5/2014 | Wiseman | G06F 15/17306 709/217 |
| 2015/0172340 | A1* | 6/2015 | Lohmar | H04N 21/2401 709/219 |

FOREIGN PATENT DOCUMENTS

JP    2012-514276 A    6/2012

* cited by examiner

*Primary Examiner* — Azizul Choudhury
(74) *Attorney, Agent, or Firm* — Canon U.S.A., Inc. IP Division (57) ABSTRACT

A communication apparatus includes: an acquisition unit configured to acquire media content; a generation unit configured to generate segments obtained by dividing the media content acquired by the acquisition unit by a predetermined division unit; a providing unit configured to provide another communication apparatus with a description file indicating a URL for acquisition of the segment already generated by the generation unit, and a URL for acquisition of a segment not yet generated by the generation unit; a receiving unit configured to receive, from the other communication apparatus, a request to specify a URL for acquisition indicated by the description file; and a transmitting unit configured to transmit, to the other communication apparatus, a segment corresponding to the URL for acquisition specified by the request of the other communication apparatus received by the receiving unit.

12 Claims, 10 Drawing Sheets

```
<?xml version="1.0"?>
<MPD type="dynamic" minimumUpdatePeriod="PT2.00S"          ~603
availabilityStartTime="20XX-XX-XXTXX:XX:XX"                ~604
timeShiftBufferDepth="PT4.00S">                            ~605
<Period start="PT0.00S" duration="PT2.00S">
  <AdaptationSet>
    <Representation id="1">                     602
      <SegmentList>
        <SegmentURL media="http://ExampleSource/segment1.mp4">
      </SegmentList>
    </Representation>
  </AdaptationSet>
</Period>                                       601
</MPD>
```

*FIG. 7*

```
<?xml version="1.0"?>
<MPD type="dynamic" minimumUpdatePeriod="PT2.00S"
availabilityStartTime="20XX-XX-XXTXX:XX:XX"
timeShiftBufferDepth="PT4.00S">
<Period start="PT2.00S" duration="PT2.00S">
   <AdaptationSet>
    <Representation id="1">
     <SegmentList>
      <SegmentURL media="http://ExampleSource/segment1.mp4">
      <SegmentURL media="http://ExampleSource/segment2.mp4">
     </SegmentList>
    </Representation>
   </AdaptationSet>
</Period>
</MPD>
```

```
<?xml version="1.0"?>
<MPD type="dynamic" minimumUpdatePeriod="PT2.00S"
availabilityStartTime="20XX-XX-XXT01:00:00"     ~805
timeShiftBufferDepth="PT4.00S">   ~806
<Period start="PT0.00S" duration="PT10.00M">   ~803
   <AdaptationSet>
    <Representation id="1">
      <SegmentTemplate duration="PT2.00S" ~807
        media=http://ExampleSource/segment$Number$.mp4  ~802
        startNumber=1>  ~804
      </SegmentTemplate>
    </Representation>
   </AdaptationSet>
                                           801
</Period>
</MPD>
```

COMMUNICATION APPARATUS, COMMUNICATION METHOD, AND PROGRAM

BACKGROUND OF THE INVENTION

Field of the Invention

The present invention relates to a communication technology for transmitting content data.

Description of the Related Art

In recent years, a stream distribution system that distributes, to users, content in streaming format including audio data and video data has been provided. In such a system, the users can view desired content such as live content during image capture, and recorded content, for example, a movie, by receiving the content with the users' own terminal apparatuses via a network.

Streaming technologies using HTTP (HyperText Transfer Protocol) (for example, MPEG-DASH) are known as technologies that enable streaming distribution via an open network such as the Internet. In these HTTP streaming technologies, content data is divided into units of several seconds, called segments, on the server side. A URL (Uniform Resource Locator) being access information to each segment is described in a playlist. The playlist is received by a playback apparatus. The access information in the playlist is used to acquire a desired segment. Accordingly, pseudo streaming is realized.

HTTP streaming used in a VoD (Video on Demand) system and the like requires to distribute multiple pieces of content data to multiple playback apparatuses. In order to handle this, original content data is generally transferred to, for example, a plurality of servers existing on the cloud to distribute processing load with a load balancer.

On the other hand, real-time content streaming places prime importance on the real-time property of content. Accordingly, it is required to deliver content acquired by image capture or the like to a playback apparatus with latency as low as possible. It is required to reduce the time from the acquisition of content data on the server side to the distribution of the content data to the playback apparatus side to distribute the content with low latency.

In a distribution system described in Japanese Unexamined Patent Application Publication (Translation of PCT Application) No. 2012-514276, a playback apparatus acquires a playlist from a server, accesses URIs (Uniform Resource Identifiers) of a plurality of content files described in the playlist in turn, and acquires the contents.

However, a case is conceivable which takes a long time from the input of content data to a communication apparatus to the acquisition of the content data by a communication partner of the communication apparatus.

For example, let's take, as an example, a case where content data (a segment) is acquired on a server side (communication apparatus side) to describe, in a playlist, a URL for requesting the content data. In this case, the server transmits the playlist to a client. The client, which has parsed the playlist, transmits a request for the content data to the server. The server, which has received the request, transmits the content data to the client. In this manner, the client can play back the content data. However, when the server transmits the content data to a playback apparatus following the above procedure, it is conceivable to take a long time from the acquisition of the segment by the server to the acquisition of the content data by the playback apparatus.

SUMMARY OF THE INVENTION

A communication apparatus includes: an acquisition unit configured to acquire media content; a generation unit configured to generate segments obtained by dividing the media content acquired by the acquisition unit by a predetermined division unit; a providing unit configured to provide another communication apparatus with a description file indicating a URL for acquisition of the segment generated by the generation unit, and a URL for acquisition of a segment not yet generated by the generation unit; a receiving unit configured to receive, from the other communication apparatus, a request to specify a URL for acquisition indicated by the description file; and a transmitting unit configured to transmit, to the other communication apparatus, a segment corresponding to the URL for acquisition specified by the request of the other communication apparatus received by the receiving unit.

Further features of the present invention will become apparent from the following description of exemplary embodiments (with reference to the attached drawings).

DESCRIPTION OF THE EMBODIMENTS

One embodiment of the present invention is described hereinafter, using the drawings. However, the present invention is not limited to the specific processing example.

<Configuration Diagram of Entire System>

Figure 1:
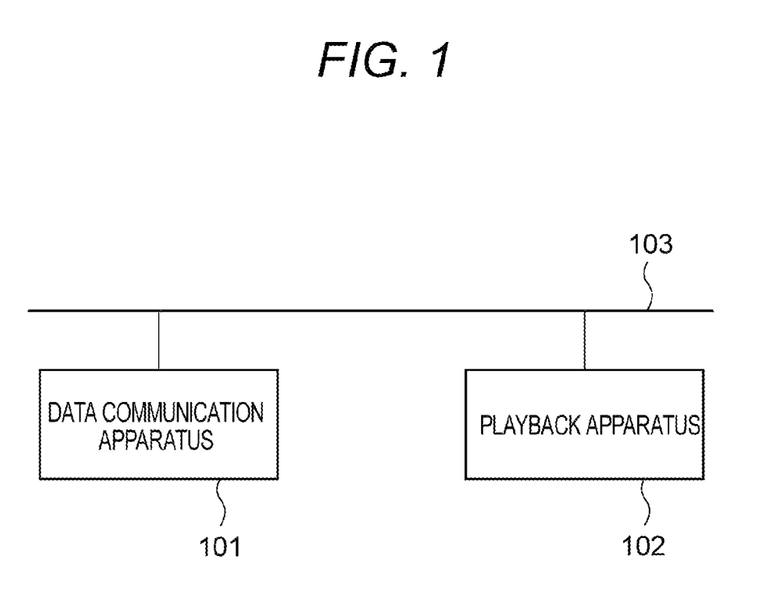
FIG. 1 is a system configuration diagram of an embodiment.

An embodiment according to the present invention is described hereinafter with reference to the accompanying drawings. FIG. 1 is a diagram illustrating a configuration example of a content data distribution system in the embodiment.

A network 103 is a general Internet line as a network in the embodiment. In the embodiment, the Internet line is used as the network. However, the network is not limited to the Internet line, and may be a public network such as a WAN, a local network such as a LAN or PAN, a dedicated line such as a VPN, an intra-network, an on-premise network, or the like. WAN stands for Wide Area Network, LAN for Local Area Network. Moreover, PAN stands for Personal Area Network, and VPN for Virtual Private Network.

A data communication apparatus 101 (hereinafter the communication apparatus 101) is a communication apparatus in the embodiment. The communication apparatus 101 can input content data (for example, video data, audio data, and text data), and transmit the input content data. Specific examples of the communication apparatus 101 include a camera device, a video camera device, a smartphone device, a personal computer, and a mobile phone. However, as long as it satisfies a hardware configuration and a function module configuration, which are described below, the communication apparatus 101 is not limited to the above examples. Moreover, the communication apparatus 101 of the embodiment includes a camera. The communication apparatus 101 acquires (generates) content data (captured data) by image capture, but may input content data acquired (generated) by another apparatus. For example, the communication apparatus 101 can also input content data from another communication apparatus connected via a network, and transmit, to a client (a playback apparatus 102), the content data whose input is complete. In the embodiment, the client (the playback apparatus 102) is a communication partner of the communication apparatus 101. Moreover, there may be one or more communication apparatuses 101 connected to the network 103.

The playback apparatus 102 has a content data playback/display function, and an interpretation function of a playlist described below, and a communication function. Specific examples of the playback apparatus 102 include a smartphone device, a PC device, a digital television, and a mobile phone. However, the playback apparatus 102 is not limited to them. Moreover, it may be configured in such a manner as that another apparatus achieves the content data playback/display function, and the interpretation function of a playlist, and communication function to communicate the content data and the playlist. There may be one or more playback apparatuses 102 connected to the network 103.

<Data Communication Apparatus Hardware Configuration Diagram>

Figure 2:
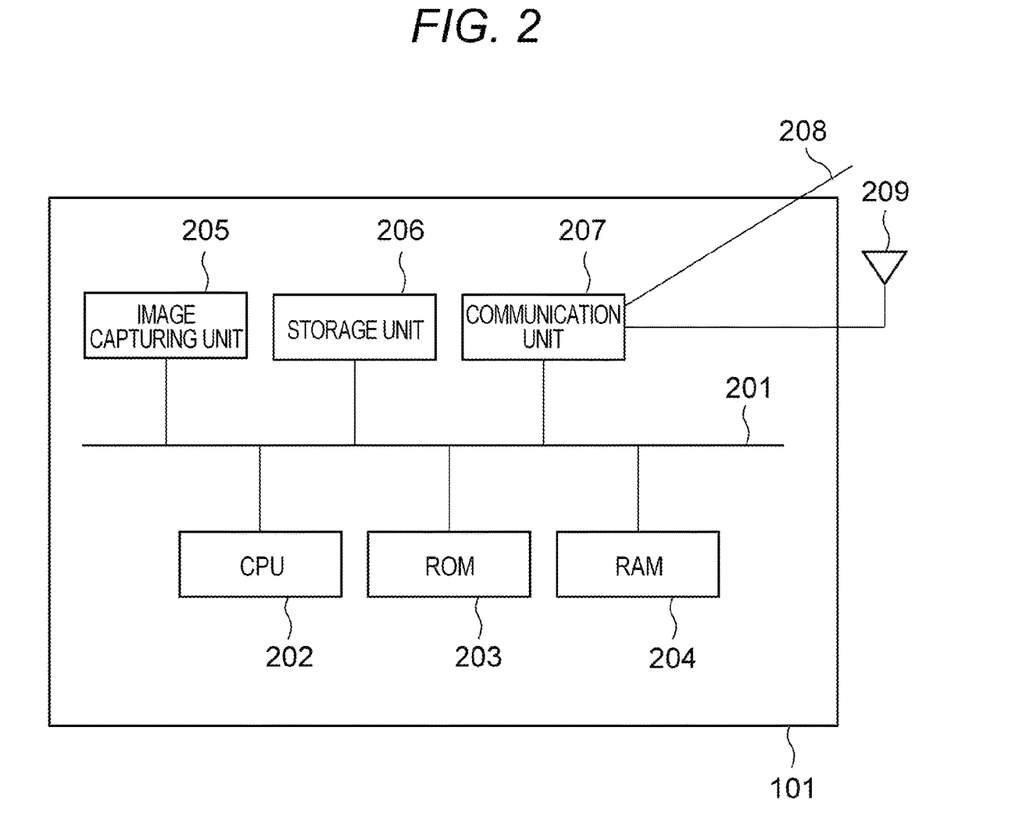
FIG. 2 is a block diagram illustrating a hardware configuration example of a data communication apparatus 101 in the embodiment.

FIG. 2 is a block diagram illustrating a hardware configuration example of the communication apparatus 101 in the embodiment. As described above, the communication apparatus 101 can be realized by a camera device, video camera device, smartphone device, personal computer, mobile phone, or the like. As illustrated in FIG. 2, the communication apparatus 101 includes a bus 201, a CPU (Central Processing Unit) 202, a ROM (Read Only Memory) 203, and a RAM (Random Access Memory) 204. Moreover, the communication apparatus 101 includes an image capturing unit 205, a storage unit 206, and a communication unit 207. However, it may be configured in such a manner as that the image capturing unit 205 and the storage unit 206 exist as different devices, and the communication apparatus 101 is connected to the image capturing unit 205 and the storage unit 206.

The CPU 202 executes various processes in accordance with computer programs and data for processing, which are stored in the ROM 203, the RAM 204, and the storage unit 206, to achieve various functions of the communication apparatus 101. Moreover, the RAM 204 is configured of a volatile recording medium such as a semiconductor memory. A computer program and data for processing to be executed by the CPU 202 are temporarily stored in the RAM 204.

The ROM 203 and the storage unit 206 are configured of a nonvolatile recording medium readable by the CPU 202, such as a magnetic or optical recording medium, or semiconductor memory. Basic programs such as a startup program of the communication apparatus 101 are stored in the ROM 203 and the storage unit 206. Moreover, application programs such as a distribution program to achieve operations of the communication apparatus 101, which are described below, and data for processing necessary to execute these programs is also stored in the ROM 203 and the storage unit 206.

It may be configured in such a manner as to install part or all of information stored in the ROM 203 and the storage unit 206 via the network 103. Moreover, the above application program may be read by the CPU 202 from a recording medium upon the execution of a process described below. In this case, upon the execution of the process, the CPU 202 records, in the RAM 204, the application program read from the recording medium, and then executes the application program. Examples of the recording medium include all recording media that can be read by the CPU 202, such as a semiconductor memory, a magnetic disk, an optical disc, a magneto-optical disk, and a magnetic tape.

The image capturing unit 205 captures an image under an instruction of the CPU 202, acquires (generates) content data, and stores the acquired content data in the storage unit 206 or RAM 204. In other words, the image capturing unit 205 acquires content data by image capture, and inputs the acquired content data to the RAM 204. Moreover, the communication unit 207 implements a protocol stack corresponding to a communication specification between the communication apparatus 101 and the playback apparatus 102, and uses either or both of a wired communication unit 208 and a wireless communication unit 209 to achieve communication. In the embodiment, the communication unit 207 implements communications protocols such as HTTP and TCP/IP (Transmission Control Protocol/Internet Protocol). The communication unit 207 transmits, to the playback apparatus 102, a playlist and content data in accordance with the communications protocols. Moreover, the communication unit 207 receives, from the playback apparatus 102, various pieces of information such as a playlist request, a content data request, a response to the transfer of content data in accordance with the communications protocols, and converts the received information into a format that can be processed by the CPU 202.

<Transmitting Apparatus Module Configuration Diagram>

Figure 3:
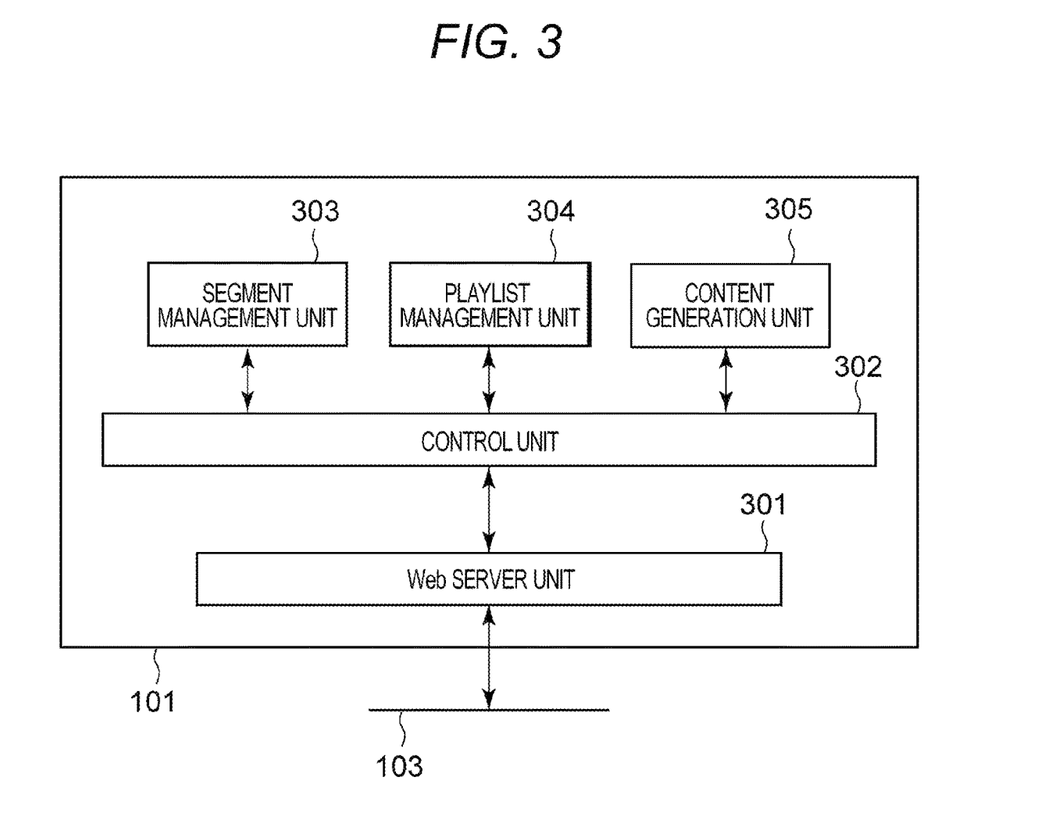
FIG. 3 is a block diagram illustrating a function module configuration example of the data communication apparatus 101 in the embodiment.

FIG. 3 is a block diagram illustrating a module configuration example of the communication apparatus 101 in the embodiment. A Web server unit 301 communicates with the playback apparatus 102 via the network 103. The Web server unit 301 acquires a requested resource from a segment management unit 303 or a playlist management unit 304 in response to a request of the playback apparatus 102, and transmits the resource. More specifically, a request the playback apparatus 102 issues to the data communication apparatus 101 is made for a URL tied to a specific resource. The Web server unit 301 interprets the URL indicated by the request of the playback apparatus 102. If the resource corresponding to the URL is a playlist, the Web server unit 301 acquires the playlist from the playlist management unit 304, and transmits the playlist to the playback apparatus 102. On the other hand, if the resource corresponding to the URL indicated by the request of the playback apparatus 102 is a segment, the Web server unit 301 acquires the segment from the segment management unit 303, and transmits the segment to the playback apparatus 102.

In the embodiment, requests to be transmitted by the playback apparatus 102 are described defining a request to request a playlist as playlist acquisition request, and a request to request a segment (content data) as content acquisition request.

A segment in the embodiment is a division unit of a case where moving image data as content data is divided by a predetermined time. However, the content data is not limited to moving image data, and may be audio data, text data, or the like, or may be their combination. Moreover, the moving image data may not be divided by the predetermined time, but may be divided by a predetermined data amount. Each predetermined data amount of moving image data can also be handled as a segment. As described above, the setting of a segment is not limited to a specific method.

The Web server unit 301 of the embodiment has an authentication function for excluding an unauthorized playback apparatus and request, and a function provided against vulnerability. Moreover, the Web server unit 301 may transmit an error message to a request for a segment that no longer exists. The segment that no longer exists is, for example, a segment that has been transferred to another server apparatus due to the passage of a predetermined time following its acquisition by the communication apparatus 101, and therefore no longer exists in the communication apparatus 101.

A control unit 302 controls the entire communication apparatus 101. The control unit 302 manages and controls the modules: the Web server unit 301, the segment management unit 303, and the playlist management unit 304.

The segment management unit 303 divides content data (for example, moving image data) acquired by a content generation unit 305 by a fixed time. The segment management unit 303 then stores segments obtained by the division, in the RAM 204 or the storage unit 206. In other words, the segment management unit 303 sequentially inputs content data (segment 1) of a first period and content data (segment 2) of a second period. In the embodiment, segment is content data (content data 1) acquired by image capture or the like during the first period. Control over whether a segment is stored in the RAM 204 or in the storage unit 206 is described below using FIG. 5.

The segment management unit 303 has a function of managing information on segments stored in the RAM 204 and the storage unit 206, and grasping a segment that can be distributed to the playback apparatus 102. Moreover, the segment management unit 303 uses the Web server unit 301 to transmit a segment to the playback apparatus 102 via the network 103. Furthermore, the segment management unit 303 manages the time required to generate the next segment.

The playlist management unit 304 generates and manages a playlist. The playlist management unit 304 of the embodiment can generate a playlist in response to the receipt of a playlist acquisition request of the playback apparatus 102, and transmit the generated playlist to the playback apparatus 102.

More specifically, when the Web server unit 301 has received a playlist acquisition request from the playback apparatus 102, the acquisition request is notified to the playlist management unit 304. The playlist management unit 304 inquires information of a segment that can be distributed to the playback apparatus 102 from the segment management unit 303, and generates a playlist based on the inquiry result.

Although the details are described below, the playlist management unit 304 of the embodiment generates a playlist indicating not only access information for causing the playback apparatus 102 to request a segment already acquired by the communication apparatus 101, but also access information of a segment that is not yet input by the communication apparatus 101. In other words, when having received a playlist acquisition request in a case where the communication apparatus 101 has already input a first segment of moving image data and has not completed the input of a second segment yet (is to input the second segment), the playlist management unit 304 generates the following playlist: that is, the playlist management unit 304 generates list information (a playlist) indicating access information (first information) for causing the playback apparatus 102 to request the first segment, and access information (second information) for causing the playback apparatus 102 to request the second segment. The Web server unit 301 transmits the generated playlist to the playback apparatus 102 via the network 103. The playback apparatus 102 does not necessarily access the first and second information after receiving a playlist.

The playlist management unit 304 can newly generate a playlist every time a new segment is generated, or can generate a playlist every fixed period. For example, when newly generating a playlist at a timing when the first segment is input, the playlist management unit 304 can generate list information (a playlist) indicating the access information of the first segment, and the access information of the second segment. The playlist management unit 304 then transmits the already generated playlist to the playback apparatus 102 in response to the receipt of the playlist acquisition request of the playback apparatus 102. A specific playlist generation method is described below using FIGS. 4 to 7.

The content generation unit 305 has a function of acquiring content data (moving image data) from the image capturing unit 205, and passing the content data to the segment management unit 303 via the control unit 302. As described above, the content data is not limited to moving image data, and may be audio data, text data, or the like, or their combination. For example, if content data is audio data, it is simply required to replace the image capturing unit 205 with a microphone.

<Playlist Generation Process>

Figure 4:
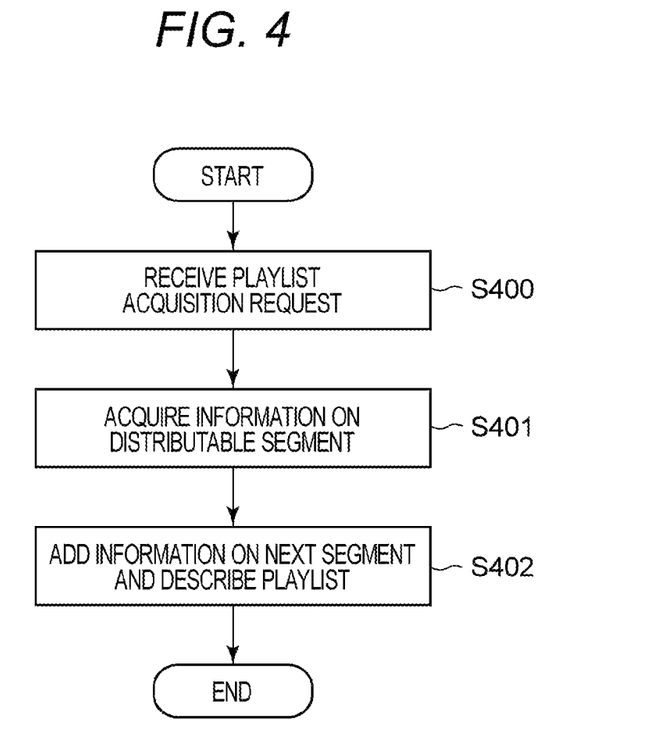
FIG. 4 is a flowchart illustrating operations of a playlist generation process in the embodiment.

FIG. 4 is a flowchart illustrating operations of when the playlist management unit 304 of the embodiment generates a playlist. The CPU 202 of the communication apparatus 101 reads a program necessary to execute the process of FIG. 4 from the ROM 203 and executes the program. Accordingly, the process of FIG. 4 is achieved. However, the process of FIG. 4 may be configured to be executed by dedicated hardware. Moreover, the process of FIG. 4 is started in response to the receipt of a playlist acquisition request of the playback apparatus 102 by the communication apparatus 101. However, the process of FIG. 4 may be configured to be started in response to the generation of a new segment or started every fixed time.

The playlist management unit 304 acquires a playlist acquisition request that the Web server unit 301 of the communication apparatus 101 received from the playback apparatus 102 (S400). However, if the process of FIG. 4 is started in response to the generation of a new segment, the playlist management unit 304 acquires a notification indicating the completion of the generation of the new segment from the segment management unit 303 in S400. Moreover, if the process of FIG. 4 is started every fixed time, the playlist management unit 304 acquires a notification indicating the passage of the fixed time from a timer in S400. The function of the timer can be achieved by a timekeeping application to be executed by the CPU 202.

The playlist management unit 304, which acquired the playlist acquisition request in S400, acquires identification information of a distributable (already input) segment from the segment management unit 303 in S401. For example, if the first segment has already been input and the input of the second segment is not yet complete at the point of S401, the playlist management unit 304 acquires identification information of the first segment from the segment management unit 303. The second segment is moving image data of a period subsequent to the first segment. The image capture by the image capturing unit 205 is continued after the acquisition of the first segment to acquire the second segment. When the playlist management unit 304 has acquired the identification information of the distributable segment in S401, execution proceeds to S402.

In S402, the playlist management unit 304 generates a playlist indicating access information for causing the playback apparatus 102 to request the segment that has already been input by the segment management unit 303, and access information of a segment whose input is not yet completed by the segment management unit 303. More specifically, the playlist management unit 304 generates a playlist indicating access information (URL) of a segment that should be acquired after the segment corresponding to the segment identification information acquired in S401.

In other words, the playlist management unit 304 generates list information (a playlist) indicating the first information of the first segment that has already been input by the segment management unit 303, and the second information of the second segment whose input is not yet completed by the segment management unit 303. The first segment corresponds to moving image data (content data) acquired in the first period. The second segment corresponds to moving image data (content data) acquired in the second period following the first period. Moreover, the access information is a URL for the playback apparatus 102 (the client) to request content data. The playlist, which was generated by the playlist management unit 304 in S402, is transmitted to the playback apparatus 102, which transmitted the playlist acquisition request. In the embodiment, the playback apparatus 102 (the client) is a communication partner of the communication apparatus 101.

<Segmentation Process of Content Data>

Figure 5:
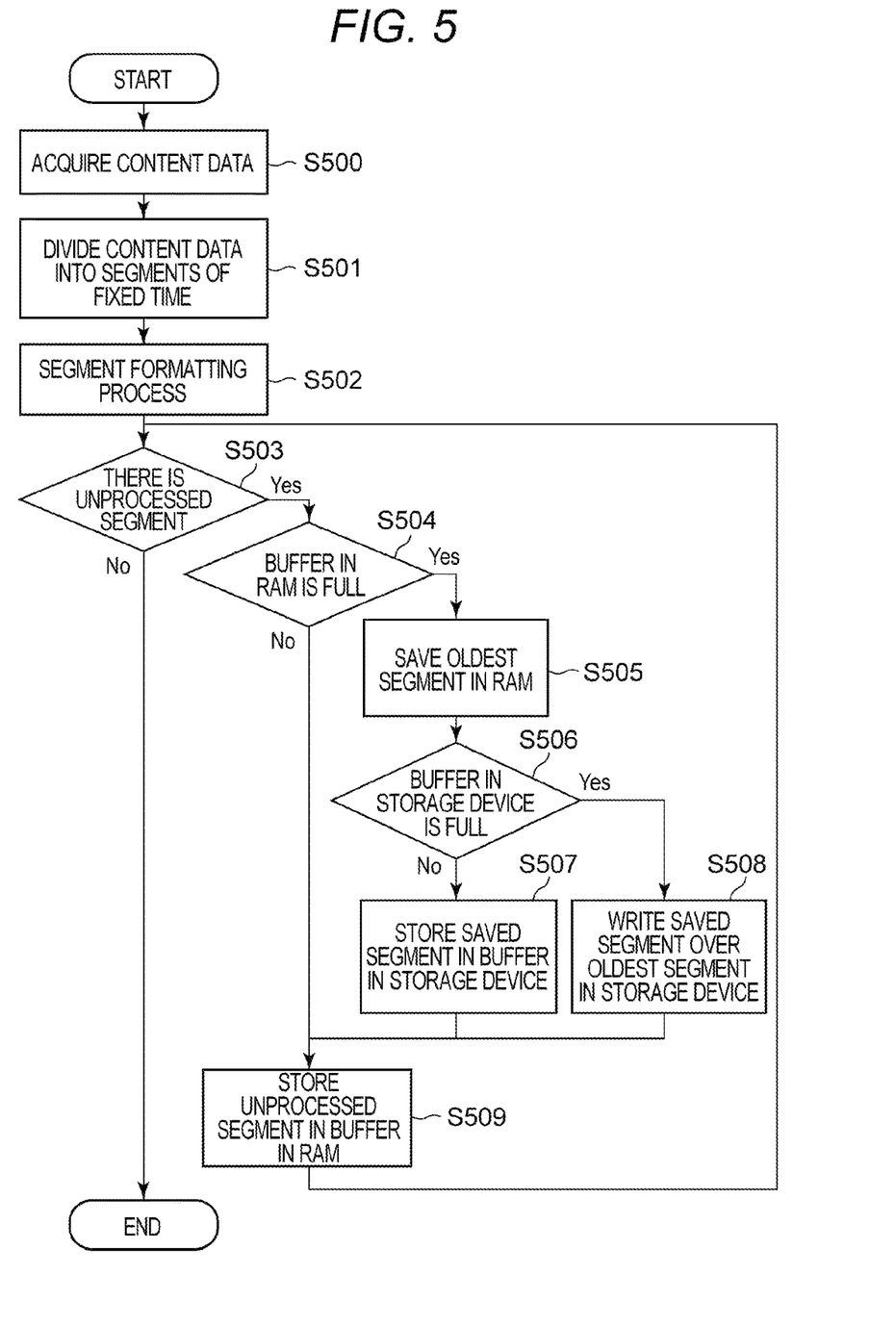
FIG. 5 is a flowchart illustrating operations of a segmentation process of content data in the embodiment.

FIG. 5 is a flowchart illustrating an operation example of a method where after content data is acquired by the segment management unit 303, the content data is divided into segments that are split by a fixed time, and the segments are stored.

The communication apparatus 101 receives a playlist acquisition request from the playback apparatus 102 to start the process of FIG. 5. However, the timing to start the process of FIG. 5 is not limited to the above timing. Moreover, the CPU 202 of the communication apparatus 101 reads a program necessary to execute the process of FIG. 5 from the ROM 203 and executes the program. Accordingly, the process of FIG. 5 is achieved. However, the process of FIG. 5 may be configured to be executed by dedicated hardware.

The segment management unit 303 acquires content data from the image capturing unit 205 via the content generation unit 305 (S500). The segment management unit 303 then divides the content data acquired in S500 by a predetermined time (for example, by two seconds), and obtains segments (S501). The embodiment is described focusing on the example where a segment is each individual divided piece of content data obtained by dividing moving image data by a predetermined time. However, the embodiment is not limited to this form. For example, the content data may be audio data or text data, or their combination. Moreover, a segment does not need to be each piece of content data divided by a predetermined time, and may be, for example, each piece of content data divided by a predetermined data amount.

The segment management unit 303 formats a segment into a content data storage format such as MP4 or M2TS (S502). The content data storage format is not limited to this. Moreover, if the content data is already formatted, this process is unnecessary.

The segment management unit 303 determines in S503 whether or not there is a not-yet-processed segment (a segment on which a storage process in the RAM 204 or the storage unit 206 is not yet complete). If it is determined that there is a not-yet-processed segment, execution proceeds to S504. On the other hand, if it is determined there is no not-yet-processed segment, and if the image capture by the image capturing unit 205 has finished, the process of FIG. 5 ends. If the image capture by the image capturing unit 205 has not finished yet although it is determined that there is no not-yet-processed segment, execution returns to the processing of S500.

The segment management unit 303 determines whether or not a buffer for segments in the RAM 204 is full (S504). The segment management unit 303 can determine whether or not the buffer for segments in the RAM 204 is full, using the following item: that is, the segment management unit 303 can use information on the size of the RAM 204 and an average size of individual segments to determine whether or not the buffer for segments in the RAM 204 is full. Moreover, the segment management unit 303 may determine whether or not the buffer for segments is full, using information on guaranteed time of low-latency transmission to the playback apparatus 102 by the communication apparatus 101 from the time of the segment storage, in addition to the size of the RAM 204 and the segment average size. The point to keep in mind is that a segment held in the RAM 204 can access at higher speeds than a segment held in the storage unit 206 and accordingly can be transmitted with low latency.

If it is determined in S504 that the buffer for segments in the RAM 204 is not full, the segment targeted to be processed is stored in the buffer for segments in the RAM 204 in S509. Execution returns to S503. The next segment is set as a process target to execute S504 and subsequent processing. On the other hand, when it is determined in S504 that the buffer for segments in the RAM 204 is full, the oldest segment in the RAM 204 is saved in the storage unit 206 in S505. In other words, in S505, the segment management unit 303 executes a process to transfer the oldest segment among a plurality of segments stored in the buffer for segments in the RAM 204 to the storage unit 206.

Moreover, the segment management unit 303 determines whether or not a buffer for segments in the storage unit 206 is full (S506). The segment management unit 303 can determine whether or not the buffer for segments in the storage unit 206 is full, using the following item: that is, the segment management unit 303 can use information on the size of the storage unit 206 and an average size of individual segments to determine whether or not the buffer for segments in the storage unit 206 is full.

Moreover, the segment management unit 303 may determine whether or not the buffer for segments is full, using information on guaranteed time of transmission to the playback apparatus 102 by the communication apparatus 101 after the time of the segment storage, in addition to the size of the storage unit 206 and the segment average size. The point to keep in mind is that, as described above, it takes longer to transmit a segment held in the storage unit 206 than the transmission of a segment held in the RAM 204. Hence, latency is increased. However, if the size of the RAM 204 is small so that many segments cannot be stored in the RAM 204, it is useful to use the storage unit 206.

When only low-latency transmission, which is realized by the distribution of a segment from the RAM 204, is performed, it is simply required to perform a process of deleting the oldest segment in the RAM 204 if it is determined in S504 that the buffer for segments in the RAM 204 is full.

If it is determined in S506 that the buffer for segments in the storage unit 206 is full, the segment management unit 303 deletes (makes it possible to overwrite) the oldest segment among the segments stored in the buffer for segments in the storage unit 206 (S508). If it is determined in S506 that the buffer for segments in the storage unit 206 is not full, the segment management unit 303 stores the segment saved in S505 in the buffer for segments in the storage unit 206 (S507).

If it is determined in S504 that the buffer for segments in the RAM 204 is not full, and if the processing of S507 or S508 is complete, execution proceeds to S509. In S509, the segment management unit 303 stores the segment targeted to be processed in an empty area of the buffer for segments in the RAM 204. When the processing of S509 is complete, the next segment is set as a process target segment to execute S503 and subsequent processing.

<Description Content of Playlist to be Generated>

Figure 6:
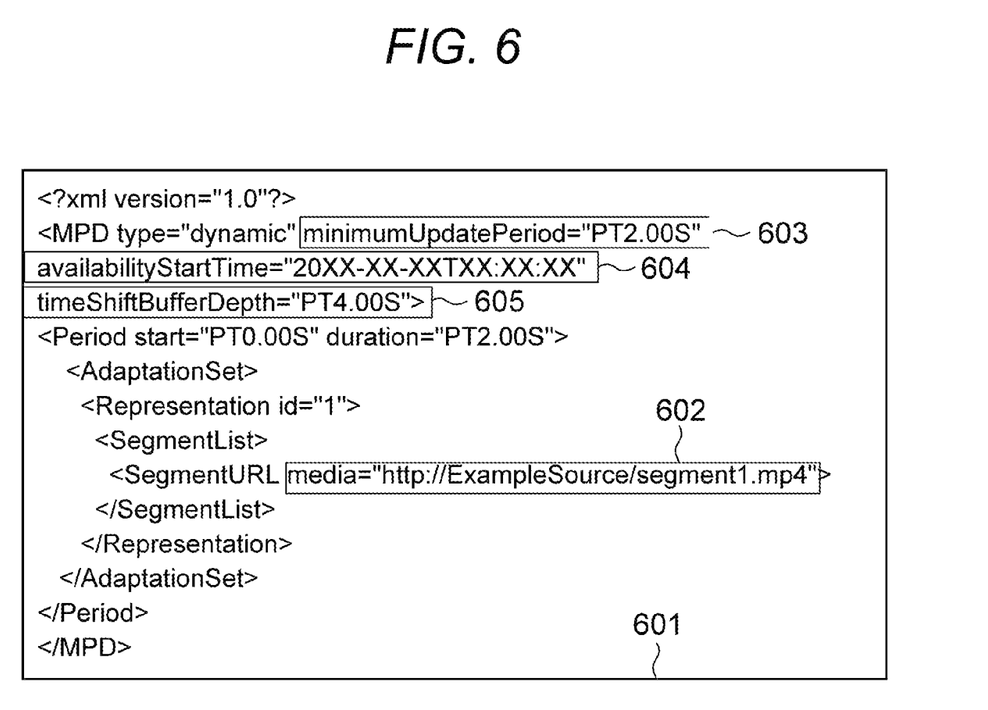
FIG. 6 is a diagram illustrating an example of a playlist in the embodiment.
Figure 7:
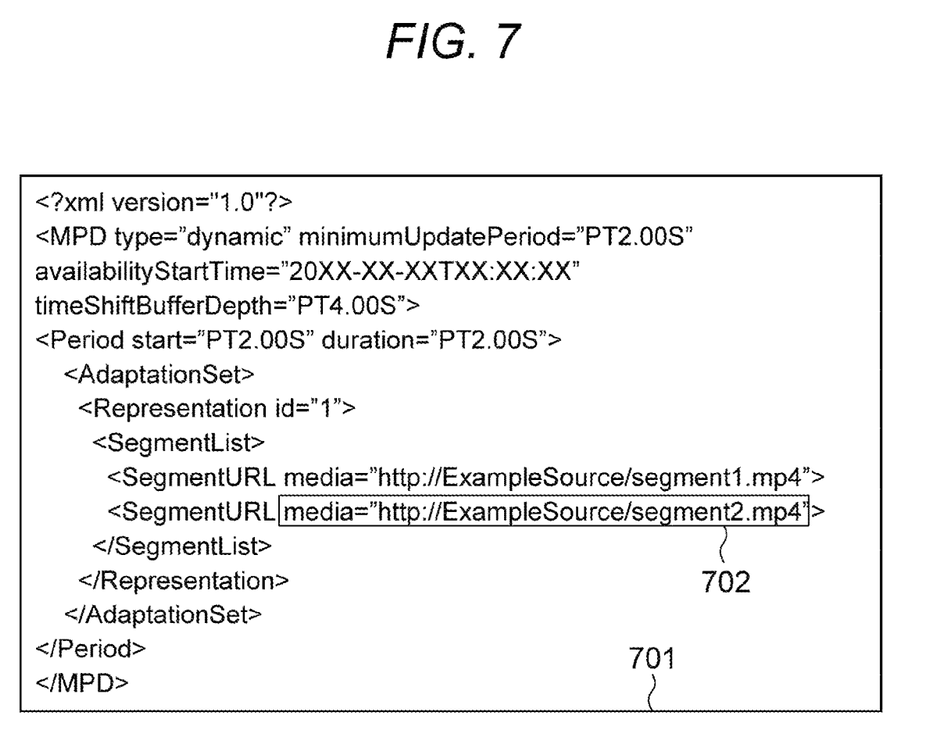
FIG. 7 is a diagram illustrating an example of a playlist in the embodiment.
Figure 8:
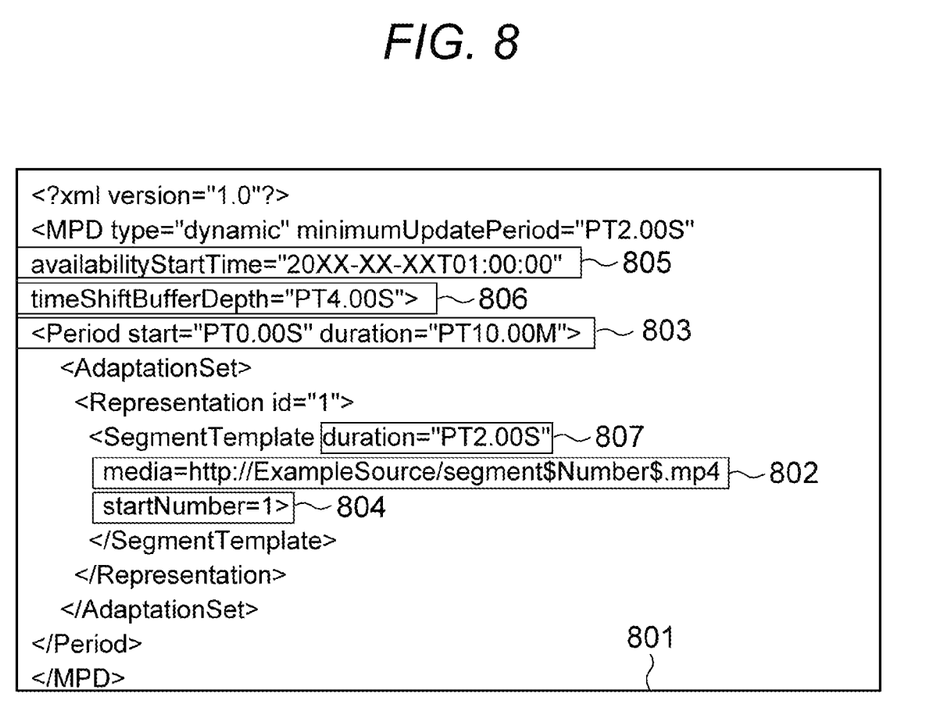
FIG. 8 is a diagram illustrating an example of a playlist in the embodiment.

Next, examples of playlists to be generated by the playlist management unit 304 of the embodiment are described using FIGS. 6 to 8. The embodiment is described taking, as an example, a case of using a MPD (Media Presentation Description) specified in MPEG-DASH as a description format of a playlist. The description format of a playlist is not limited to a MPD of MPEG-DASH and may be pursuant to it. Moreover, it should be noted that part of necessary information for a playlist is omitted to simplify the description in FIGS. 6 to 8.

A first description example is described using FIGS. 6 and 7. Playlists illustrated in FIGS. 6 and 7 are description examples using a Segment List scheme (segment list scheme). In the Segment List scheme, a playlist describing a list of distributable segments is generated. A reference numeral 602 is a URL for acquiring segment 1. The playback apparatus 102, which has acquired a playlist 601, accesses the URL 602 and accordingly can request segment 1 from the communication apparatus 101. In other words, the playlist 601 of FIG. 6 is list information indicating access information (the URL 602) for causing the playback apparatus 102 (the client) to request segment 1 (the first segment). The playback apparatus 102 does not necessarily access information included in the acquired list information.

Moreover, in FIG. 6, a host name indicated in ExampleSource indicates identification information of the communication apparatus 101. However, it is not limited to the host name. An IP address or the like may be described as long as it identifies the communication apparatus 101. minimumUpdatePeriod indicated by a reference numeral 603 is a value for notifying a playlist update timing. The playback apparatus 102 is expected to transmit a playlist acquisition request at this intervals.

availabilityStartTime indicated by a reference numeral 604 indicates a time (validity start time) when the playlist becomes valid. The playback apparatus 102 compares the validity start time 604 with the current time and accordingly can know a segment that the communication apparatus 101 can transmit at the present time. In other words, the validity start time can be translated into the time when the communication apparatus 101 starts inputting (starts generating) content data. timeShiftBufferDepth indicated by a reference numeral 605 indicates information on a period during which the distribution of a segment from the server side (the communication apparatus 101) is guaranteed (a distribution guaranteed time). The information can be determined by the number of buffers for segments that store segments, which are described in FIG. 5.

Figure 9:
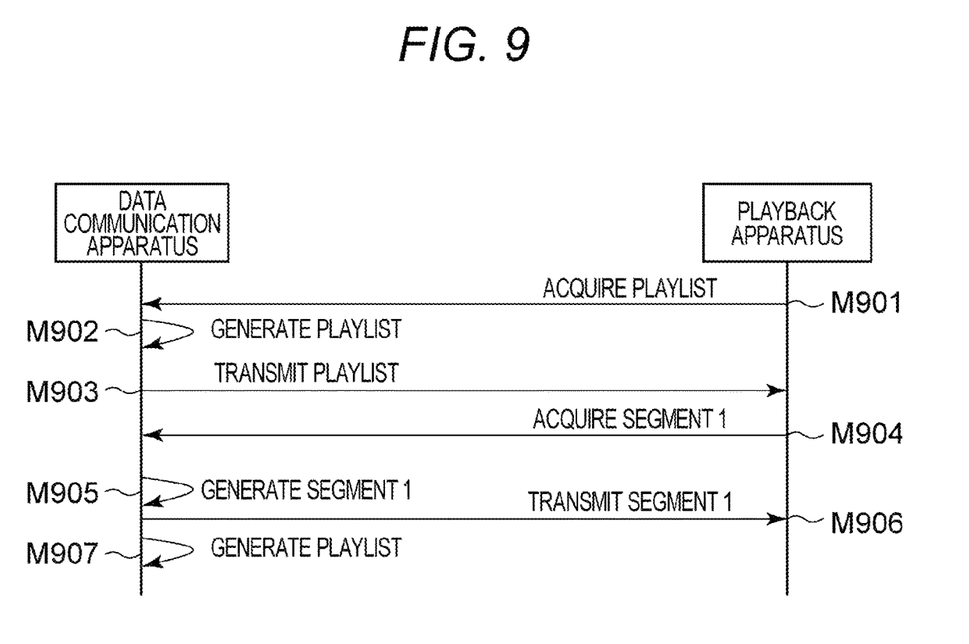
FIG. 9 is a sequence diagram illustrating examples of messages between the data communication apparatus 101 and a playback apparatus 102 in the embodiment.

The above playlist 601 is a playlist generated in M901 in FIG. 9. The details of a sequence of FIG. 9 are described below, but M901 is a timing before segment 1 is input (generated). In other words, the playlist management unit 304 of the embodiment generates list information (the playlist 601) indicating the first information for causing the playback apparatus 102 to request segment 1 before the input of segment 1 is complete.

A playlist 701 illustrated in FIG. 7 is a playlist to be updated in M907 in FIG. 9. In FIG. 7, a reference numeral 702 is a URL for causing the playback apparatus 102 to request segment 2 generated in the communication apparatus 101. M907 of FIG. 9 is a timing when the input (generation) of segment 1 is complete, and the input (generation) of segment 2 following segment 1 is not complete. In other words, the playlist management unit 304 generates list information (the playlist 701) describing both the access information of the first segment and the access information of the second segment at a timing when the input of segment 2 is not complete. In the embodiment, a URL having a difference only in the number indicating the segment generation sequence is set as an access destination. For example, a difference between a URL indicating the access information of segment 1 and a URL indicating the access information of segment 2 is simply in the end of the URL, whether it is Segment1 or Segment2. With such a configuration, the playlist management unit 304 can easily generate list information for causing the playback apparatus 102 to request a segment whose input (generation) is not yet complete. However, the method for generating access information is arbitrary. In this manner, in the Segment List scheme, access information of a segment that becomes distributable next is added to list information to execute the processing of S402 of FIG. 4.

A second description example is described using FIG. 8. In FIG. 8, a description example of a playlist of a Segment Template scheme (segment template scheme) is described. The size of a MPD can be reduced using the Segment Template in the MPD format of MPEG-DASH. For example, in a description method of the Segment List scheme indicated by the playlist 701 of FIG. 7, it is necessary to add a Segment List line as the number of segments increases. Accordingly, the size of the MPD increases. A URL is templated with the Segment Template. Accordingly, even if there are many segments, the size of the MPD can be reduced.

A reference numeral 801 illustrated in FIG. 8 is a specific example of a playlist described in the segment template scheme. A URL template is described at a point indicated by a reference numeral 802. The playback apparatus 102 can identify a URL to a desired segment by substituting a segment number into a portion of $Number$. In the Segment Template scheme, the client (the playback apparatus 102) can identify an access URL to acquire a segment based on the template, unlike the Segment List scheme. In the above example, the client (the playback apparatus 102) accesses a URL where 1 is inserted in the position of $Number$ and accordingly can request segment 1. Moreover, the client accesses a URL where 2 is inserted in the position of $Number$ and accordingly can request segment 2.

In other words, the playlist management unit 304 generates list information (a playlist) including a template. The playback apparatus 102 can identify the first information (a first URL) for requesting segment 1 by inserting the identification information (1) of segment 1 into the template. Moreover, the playback apparatus 102 can identify the second information (a second URL) for requesting segment 2 by inserting the identification information (2) of segment 2 into the template. Segment 1 is content data acquired in the first period. Segment 2 is content data acquired in the second period following the first period. In the embodiment, the first and second periods are continuous periods.

In the segment template scheme, the number of a currently distributable segment can be determined by the playback apparatus 102 based on information of reference numerals 805 and 806 and the current time, a duration corresponding to a period indicated by a reference numeral 803, and a start number indicated by a reference numeral 804. Hence, these values are changed in the communication apparatus 101 and accordingly a playlist can be generated as if a segment that is not yet input (not yet generated) can be distributed.

The reference numeral 805 is information corresponding to the validity start time 604 of FIG. 6, and indicates a time when the playlist 801 becomes valid. Moreover, the reference numeral 806 is information corresponding to the distribution guaranteed period 605 of FIG. 6, and indicates a period during which the distribution of a segment from the server side (the communication apparatus 101) is guaranteed. For example, if the distribution guaranteed period 806 is four seconds, when the communication apparatus 101 receives a request for segment 1 from the playback apparatus 102 before four seconds have passed since the generation of segment 1, segment 1 is transmitted to the playback apparatus 102. On the other hand, when the communication apparatus 101 receives a request for segment 1 after five seconds have passed since the generation of segment 1, the transmission of segment 1 is not guaranteed. Moreover, the reference numeral 803 of FIG. 8 indicates a period during which the playlist 801 is valid. In the example of FIG. 8, it is described as "1". Accordingly, it is indicated that the playlist 801 is valid for ten minutes from the time indicated by the validity start time 805. Moreover, the reference numeral 804 indicates the first value of variables in the template. In the example of FIG. 8, it is described as "1". Accordingly, it can be seen that "1" is substituted into $Number$ to acquire the first segment. Moreover, a continuation duration 807 indicates the length (duration) of content data corresponding to one segment. In the example of FIG. 8, "2.00 S" is described in the continuation duration 807. Accordingly, it can be seen that the length of each segment is two seconds.

A case is considered in which the playback apparatus 102 acquires the playlist 801 illustrated in FIG. 8, and further the current time is 20XX-XX-XXT01:00:10. In this case, it can be seen that ten seconds passed between the time 20XX-XX-XXT01:00:00 indicated by the validity start time 805 and the current time. Moreover, each segment is two-second data according to the continuation duration 807. Accordingly, the playback apparatus 102 can determine that five segments 1, 2, 3, 4, and 5 starting from the start number 1 can be distributed. However, the distribution guaranteed period indicated by the distribution guaranteed period 806 is assumed to be sufficiently long.

In this case, for example, if the validity start time 805 is changed to 20XX-XX-XXT00:59:58, it is possible to cause the playback apparatus 102 to determine that six segments, segments 1 to 6, can be distributed. In other words, in a playlist in the segment template scheme of the embodiment, the validity start time indicating the time when the playlist becomes valid can be described. The playlist management unit 304 then generates a playlist including a time prior to the time when the segment management unit 303 starts inputting (starts generating) content data, as a validity start time of the playlist. Consequently, the playback apparatus 102, which has received the playlist in the segment template scheme, can become possible to transmit an acquisition request to a segment that is not yet input (not yet generated) in the communication apparatus 101.

In this manner, a segment that is not yet input is described in the playlist as if it is distributable. Accordingly, it becomes possible to transmit an acquisition request of the playback apparatus 102 at an earlier timing. With the configuration, it is possible to reduce the time between the time when the communication apparatus 101 acquires a segment and the time when the playback apparatus 102 (the client) acquires the segment. Moreover, in terms of processing on the playback apparatus 102 side, it should be noted that special processing is unnecessary, and a general-purpose client pursuant to MPEG-DASH will do.

In the above embodiment, the description has focused on the example of the case of generating a playlist indicating access information of one segment that is not yet input. However, the playlist management unit 304 can also generate a playlist including access information of a plurality of segments that are not yet input. For example, in a case where segment 1 has already been input and the input of segment 2 and later segments is not yet complete, the playlist management unit 304 can generate a playlist indicating second and third information for the playback apparatus 102 to request segments 2 and 3.

Moreover, the number of pieces of access information of segments that are not yet input to be described in a playlist may be configured to be selectable depending on the communication environment and the state of the client (the playback apparatus 102). For example, it is possible to generate a playlist including access information of more segments that are not yet input if the communication speed of a network is low than if the communication speed is high, and transmit the playlist to the playback apparatus 102. Moreover, for example, it is possible to generate a playlist including access information of more segments that are not yet input if a change in the communication speed of a network is large than if the change is small, and transmit the playlist to the playback apparatus 102. Consequently, even in a communication environment where it takes time for the playback apparatus 102 to acquire a playlist from the communication apparatus 101, content data can be played back with low latency. Moreover, it is also possible to reduce the number of exchanges of a playlist.

Moreover, it is possible to generate a playlist including access information of more segments that are not yet input if the processing capacity of the client (the playback apparatus 102) is low, and transmit the playlist to the playback apparatus 102. Consequently, the processing load of the acquisition of a playlist can be reduced.

Moreover, the embodiment has been described focusing on the example of the case where the client that acquires content data from the communication apparatus 101 is the playback apparatus 102. However, the client is not limited to this. For example, the client may be, for example, a recorder that records content data.

<Content Distribution Sequence>

A sequence of exchanges between the data communication apparatus 101 and the playback apparatus 102 upon content distribution is described using FIG. 9. In terms of the playlist description method, a case of using the above-mentioned Segment List scheme is described.

In M901, when having received a playlist acquisition request from the playback apparatus 102, the communication apparatus 101 transitions to a transmission mode where content data can be transmitted. However, the transition to the transmission mode may be triggered separately from the receipt of the playlist acquisition request.

After the transition to the transmission mode, the communication apparatus 101 generates a playlist (M902). The playlist generated in M902 is, for example, the playlist 601 illustrated in FIG. 6. As illustrated in FIG. 6, the playlist 601 includes the access information (the first information) for causing the playback apparatus 102 to request segment 1. However, as illustrated in FIG. 9, segment 1 is generated at a timing of M905. In this manner, the playlist management unit 304 of the communication apparatus 101 of the embodiment generates a playlist (list information) indicating the access information (the first information) for causing the playback apparatus 102 to request segment 1 before the input of segment 1 is complete.

The playlist management unit 304 of the communication apparatus 101 then transmits the playlist generated in M902 to the playback apparatus 102 (M903). In other words, the playlist management unit 304 of the communication apparatus 101 transmits the list information for causing the playback apparatus 102 to request segment 1 to the playback apparatus 102 before the input of segment 1 is completed by the segment management unit 303.

The playback apparatus 102, which has received the playlist 601, parses the playlist 601, and transmits a content acquisition request to request segment 1 (M904). The segment management unit 303 of the communication apparatus 101, which has received the content acquisition request to request segment 1, transmits segment 1 to the playback apparatus 102 (M906). As illustrated in FIG. 9, if having not completed the input of segment 1 at a timing when receiving the content acquisition request to request segment 1, the communication apparatus 101 stands by until the completion of the input of segment 1. However, if it is determined that the standby time exceeds a predetermined time, the segment management unit 303 can transmit an error message to the playback apparatus 102.

Moreover, after the completion of the input of segment 1, the playlist management unit 304 updates the playlist 601 and generates the playlist 701 (M907). As illustrated in FIG. 7, segment access information of segment 2, in addition to the access information of segment 1, is indicated in the playlist 701. Moreover, as illustrated in FIG. 9, segment 2 is not yet input by the segment management unit 303 at the timing of M907. In this manner, the playlist management unit 304 of the embodiment generates the list information (the playlist 701) indicating the access information (the second information) of segment 2 whose input is not yet complete, together with the access information (the first information) of segment 1 that has already been input. The playlist management unit 304 then transmits the generated playlist 701 to the playback apparatus 102.

When having received a content acquisition request to request segment 2 from the playback apparatus 102, which received the playlist 701, the communication apparatus 101 inputs segment 2 and then transmits the segment 2 to the playback apparatus 102. In other words, when having received a request for content data of segment from the client (the playback apparatus 102), which received the playlist 701, the segment management unit 303 transmits segment 2 input after the generation of the playlist 701, to the playback apparatus 102.

However, the segment management unit 303 may be configured to transmit an error message to the playback apparatus 102 when it is determined that the standby time required from the receipt of the request to acquire segment 2 to the input of segment 2 by the segment management unit 303 exceeds the predetermined time.

<Process Upon Request to Acquire not-Yet-Acquired Segment>

Figure 10:
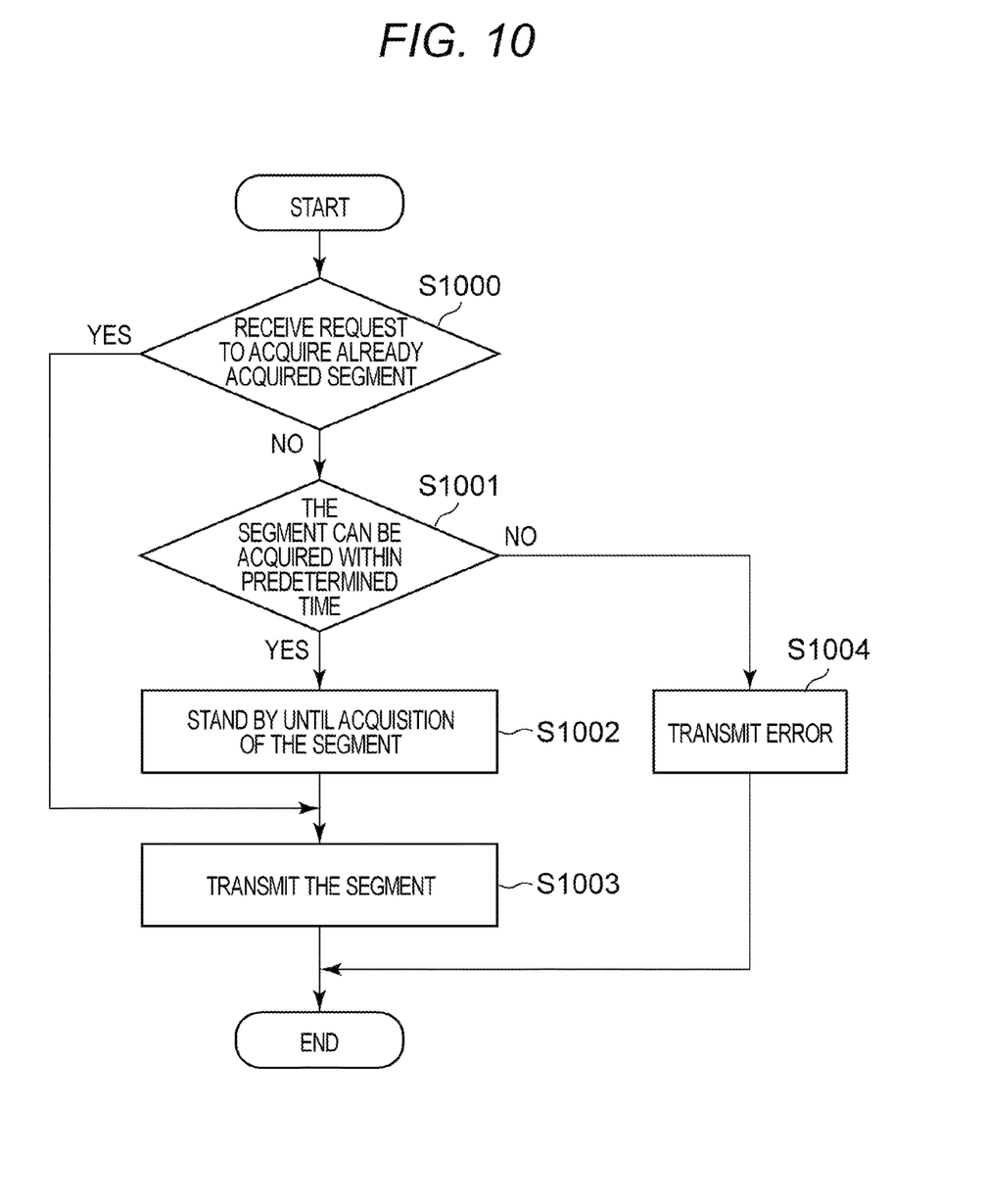
FIG. 10 is a flowchart for explaining operations of the data communication apparatus 101 in the embodiment.

A description is given of operations of when the communication apparatus 101 receives a content data acquisition request from the playback apparatus 102, using FIG. 10. The CPU 202 of the communication apparatus 101 reads a program necessary to execute the process of FIG. 10 from the ROM 203 to execute the program. Accordingly, the process of FIG. 10 is achieved. However, the process of FIG. 10 may be configured to be executed by dedicated hardware. Moreover, the process of FIG. 10 is started when a playlist acquisition request is received from the playback apparatus 102. However, a start timing in FIG. 10 is not limited to the above timing.

When having received a content data acquisition request from the playback apparatus 102, the control unit 302 determines whether the request is a request to acquire a segment that has already been input by the communication apparatus 101, or a request to acquire a segment that is not yet input (S1000). If it is determined to be a request to acquire a segment that has already been input, execution proceeds to S1003. A segment stored in the buffer for segments in the RAM 204 or the storage unit 206 is read out and transmitted to the playback apparatus 102. On the other hand, if it is determined to be a request to acquire a segment whose input is not yet complete, execution proceeds to S1001.

The control unit 302 determines in S1001 whether or not the input of the not-yet-input segment requested by the playback apparatus 102 can be completed within a predetermined time. Specifically, the control unit 302 acquires the time taken to input the not-yet-input segment by inquiring of the segment management unit 303, and determines whether or not the time is longer than the predetermined time. The segment management unit 303 can identify the time taken to complete the input of the next segment based on information on an interval for the generation of a segment. Moreover, when the input of a segment is complete (the image capturing unit 205 ends image capture), the segment management unit 303 notifies it to the control unit 302.

When it is determined that the input of the not-yet-input segment can be completed within the predetermined time, the control unit 302 stands by until the segment management unit 303 completes the input of the segment (S1002), and transmits the segment to the playback apparatus 102 (S1003). On the other hand, when it is determined that the input of the not-yet-input segment requested by the playback apparatus 102 cannot be completed within the predetermined time, the control unit 302 transmits an error message to the playback apparatus 102.

In other words, the communication apparatus 101 determines time information in accordance with the time (standby time) from the receipt of a request for content data to the completion of the input of the content data. When the time information corresponds to a longer time than the predetermined time, the communication apparatus 101 transmits an error message to the playback apparatus 102. On the other hand, when the time information corresponds to a shorter time than the predetermined time, the communication apparatus 101 does not transmit an error message to the playback apparatus 102, and transmits the content data to the playback apparatus 102 after the input of the content data is complete. Consequently, for example, in a state where image capture by the image capturing unit 205 ends, and accordingly a new segment is no longer acquired, it is possible to prevent a situation where the playback apparatus 102 keeps waiting for the new segment.

In the description of FIG. 10, the configuration was described in which if the standby time until the input of a segment that is not yet input is complete is equal to or longer than the predetermined time, an error message is transmitted. However, the configuration is not limited to this. For example, the control unit 302 of the communication apparatus 101 may transmit an error message regardless of the standby time if the input of a segment corresponding to an acquisition request of the client (the playback apparatus 102) is not complete. Moreover, the segment management unit 303 may notify an error with sound, a lamp, and the like, not limited to the transmission of an error message.

According to the configuration of the embodiment, it is possible to reduce the time taken for a communication partner of a communication apparatus to acquire content data after the content data is input to the communication apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-227616, filed Nov. 8, 2014, which is hereby incorporated by reference herein in its entirety.

What is claimed is:

1. A server device for providing, to a client device, one or more media segments obtained by dividing media data by time-based division, the server device comprising:
a processor; and
a memory storing one or more programs configured to be executed by the processor, the one or more programs including instructions for:
acquiring mediadata;
generating media segments by dividing the media data by a predetermined time-based division unit;
providing a client device with a description file indicating at least both of (i) a first URL referred to by the client device to request a media segment already generated and (ii) a second URL referred to by the client device to request a media segment not yet generated;
receiving, from the client device, a request based on at least one URL among URLs indicated by the description file;
transmitting, to the client device, a media segment according to the at least one URL identified by the request from the client device; and
upon receiving a request for the not-yet-generated media segment from the client device, determining time taken to generate the media segment,
wherein, in a case where the time is less than a threshold value, the media segment is transmitted to the client device after the media segment is generated, and, in a case where the time is equal to or more than the threshold value, a predetermined notification is transmitted to the client device.

2. The server device according to claim 1, wherein the description file describing character strings specifying the first URL for acquisition of the already generated media segment by inserting a first value corresponding to the already generated media segment, and specifying the second URL for acquisition of the media segment not yet generated by inserting a second value corresponding to the not-yet-generated media segment.

3. The server device according to claim 2, wherein the description file describes first time information indicating a start time of the media data, and second time information indicating a time period corresponding to one media segment so that the client device identifies the number of media segments that can be acquired, based on a differential time between the start time indicated by the first time information and a current time, and the time period corresponding to one media segment, and
a time prior to a time to start acquisition of the media data is described as the first time information described in the description file.

4. The server device according to claim 1, wherein upon receiving the request for the not-yet-generated media segment from the client device, a predetermined notification is transmitted to the client device.

5. The server device according to claim 1, wherein upon receiving the request for the not-yet-generated media segment from the client device, the media segment is transmitted to the client device after the media segment is generated.

6. The server device according to claim 1, further comprising an imaging device,
wherein the media data is acquired based on image capture by the imaging device.

7. The server device according to claim 1, further including instructions for:

determining a communication state in a network connecting the server device to the client device; and identifying the number of the not-yet-generated media segments whose URLs for acquisition are described in the description file, based on the determination result of the communication state, wherein the description file describes URLs for requesting the not-yet-generated media segments, the number of which corresponds to the number identified in the identifying, and the URL for requesting the media segment already generated.

8. The server device according to claim 1, wherein the second URL is for requesting a media segment whose media data has not been obtained by the server device when the server device generates the description file.

9. A method for providing, by a server device, to a client device, one or more media segments obtained by dividing media data by time-based division, the method comprising:

acquiring media data;

generating media segments by dividing the media data by a predetermined time-based division unit;

providing a client device with a description file indicating at least both of (i) a first URL referred to by the client device to request a media segment already generated, and (ii) a second URL referred to by the client device to request a media segment not yet generated;

receiving, from the client device, a request based on at least one URL among URLs indicated by the description file;

transmitting, to the client device, a media segment according to the at least one URL identified by the received request from the client device; and upon receiving a request for the not-yet-generated media segment from the client device, determining time taken to generate the media segment, wherein, in a case where the time is less than a threshold value, the media segment is transmitted to the client device after the media segment is generated, and, in a case where the time is equal to or more than the threshold value, a predetermined notification is transmitted to the client device.

10. The method according to claim 9, wherein upon receiving the request for the not-yet-generated media segment from the client device, a predetermined notification is transmitted to the client device.

11. A non-transitory computer-readable storage medium storing a program for causing a computer to execute a method for providing, by a server device, to a client device, one or more segments obtained by dividing media data by time-based division, the method comprising:

acquiring media data;

generating media segments by dividing the media data by a predetermined time-based division unit;

providing a client device with a description file indicating both of (i) a first URL referred to by the client device to request a media segment already generated, and (ii) a second URL referred to by the client device to request a media segment not yet generated;

receiving, from the client device, a request based on at least one URL among URLs indicated by the description file;

transmitting, to the client device, a media segment according to the at least one URL identified by the received request from the client device; and upon receiving a request for the not-yet-generated media segment from the client device, determining time taken to generate the media segment, wherein, in a case where the time is less than a threshold value, the media segment is transmitted to the client device after the media segment is generated, and, in a case where the time is equal to or more than the threshold value, a predetermined notification is transmitted to the client device.

12. The medium according to claim 11, wherein upon receiving the request for the not-yet-generated media segment from the client device, a predetermined notification is transmitted to the client device.

* * * * *